United States Patent
Swartz

[19]

[11] Patent Number: 5,877,485
[45] Date of Patent: Mar. 2, 1999

[54] STATISTICAL SAMPLING SECURITY METHODOLOGY FOR SELF-SCANNING CHECKOUT SYSTEM

[75] Inventor: Jerome Swartz, Old Field, N.Y.

[73] Assignee: Symbol Technologies, Inc., Holtsville, N.Y.

[21] Appl. No.: 787,728

[22] Filed: Jan. 24, 1997

Related U.S. Application Data

[60] Provisional application No. 60/011,054 Jan. 25, 1996.

[51] Int. Cl.$^6$ ..................... G06K 7/10
[52] U.S. Cl. .......................... 235/383; 235/385; 186/61; 705/23
[58] Field of Search ..................... 235/383, 385, 235/462; 186/61, 52; 705/16, 17, 23

[56] References Cited

U.S. PATENT DOCUMENTS

| | | | |
|---|---|---|---|
| 3,878,365 | 4/1975 | Schwartz | 235/383 |
| 4,676,343 | 6/1987 | Humble et al. | 186/61 |
| 4,779,706 | 10/1988 | Mergenthaler | 186/61 |
| 4,787,467 | 11/1988 | Johnson | 235/383 |
| 4,929,819 | 5/1990 | Collins | 235/383 |
| 5,083,638 | 1/1992 | Schneider | 186/61 |
| 5,115,888 | 5/1992 | Schneider | 186/52 |
| 5,125,465 | 6/1992 | Schneider | 186/61 |
| 5,168,961 | 12/1992 | Schneider | 186/52 |
| 5,378,860 | 1/1995 | Dingfelder et al. | 177/25.19 |
| 5,418,354 | 5/1995 | Halling et al. | 235/383 |
| 5,434,394 | 7/1995 | Roach et al. | 235/385 |
| 5,437,346 | 8/1995 | Dumont | 186/61 |
| 5,457,307 | 10/1995 | Dumont | 235/383 |
| 5,494,136 | 2/1996 | Humble | 186/61 |
| 5,515,944 | 5/1996 | Cappi et al. | 186/61 |
| 5,543,607 | 8/1996 | Watanabe et al. | 235/383 |
| 5,595,264 | 1/1997 | Trotta, Jr. | 235/383 |
| 5,635,906 | 6/1997 | Joseph | 235/383 |
| 5,640,002 | 6/1997 | Ruppert et al. | 235/383 |
| 5,659,469 | 8/1997 | Deaton et al. | 705/23 |
| 5,679,938 | 10/1997 | Templeton et al. | 235/379 |

OTHER PUBLICATIONS

Praskey, Sally, "Self scanning: Check it out!." http://www-.mhbizlink.com/Content/grocer/12–96—features.html, pp. 1–3, Dec. 1996.

*Primary Examiner*—Anita Pellman Gross
*Assistant Examiner*—Drew A. Dunn

[57] ABSTRACT

Disclosed is the implementation of a statistical basis for use in a self-scanning checkout system for determining how many items to check in a shopper's shopping cart for incorrect or missing scans as well as which particular or types of items to check to determine if they were properly scanned by a shopper who may use a portable scanner or scanning terminal to scan bar codes on selected items. In the present invention, every or nearly every shopper will be checked by a cashier or security guard, but only a limited and select number of items will be checked for each shopper. The present methodology determines how many items to check for a given shopper as well as which particular items to check for that shopper. The following factors may be considered, alone or in varying combinations, in determining the number of items to check for a particular shopping transaction: shopper frequency (the number of times the shopper has visited that store); queue length (the length of the checkout line at that time); prior history (check more items if the shopper has had errors in the past, check less items if the shopper has had no errors in the past); store location (check more items in stores located in areas with a high risk of pilferage); time of day, day of week, date of year (determine if pilferage more likely at certain times of day or year); number of times items are returned to shelf during shopping; and dwell time between scans.

30 Claims, 5 Drawing Sheets

STATISTICAL SAMPLING SECURITY METHODOLOGY FOR SELF-SCANNING CHECKOUT SYSTEM

This application claims the benefit of U.S. Provisional Application No. 60/011,054, filed Jan. 25, 1996.

BACKGROUND OF THE INVENTION

This invention relates to self-service shopping, and in particular to a methodology for improving the security of a self-service shopping system by the use of statistical sampling of shoppers and their purchases.

Self-service shopping systems are desired for their ability to offload service-oriented functions from human labor forces and provide automatic assistance to the shopper for increase in response time, efficiency, throughout, lower cost, and the like. For example, systems in the prior art provide each shopper with a portable bar code scanning device, which is used to scan the bar code located on a product in order to determine the price by accessing a locally stored look-up table and keep a tally list of all items selected for purchase. When the shopper is finished selecting items for purchase and scanning the bar codes on the items, he places the self-scanner into a recess in a stationary (i.e., wall-mounted) cradle, wherein a list of items selected is printed out for a receipt and provided to the shopper. The shopper then brings the list along with the cart of selected items to a clerk for tender of final payment and, possibly, an audit of items selected for purchase in order to ensure that all items selected and placed in the cart were properly scanned. This self-service scenario speeds shoppers through the store quicker than the conventional conveyor belt/cashier environment typical in stores today.

Security in a self-service shopping system as described above is a major concern of retailers. Shoppers who fail to scan the bar code of an item placed in their shopping cart will bring the item home without proper payment, whether such failure to scan the item is intentional or inadvertent. In addition, shoppers may scan an item but place a different (i.e., more expensive) item in their cart. Therefore, some methodology of checking shoppers' purchases must be implemented in order to satisfy security criteria.

Two goals of a self-checkout system are to increase shopper throughout and to save in labor costs. Ideally, a shopper can scan his items when selected from the shelf and save scanning time at the checkout line. In addition, stores would require less human labor since there is a reduction in the number of cashiers required. However, there is still a requirement to scan some items from a shopper's cart in order to flag an attempted theft as well as to provide deterrence against pilferage. Thus, some labor is required to scan at least some of the items leaving the store. At one extreme, a system where every shopper has all of his purchase items re-scanned is not feasible since there is no net time savings in such a system (all purchases are scanned by a cashier anyway). There is therefore a need to determine which items are to be scanned in order to maximize the potential for catching pilferage, provide maximum deterrence against theft, minimize labor costs in checking the shoppers' scanned items, maintain the increased throughput achieved by the self-checkout system, and avoid the negative inferences inherently made by shoppers whose items are checked by an exit cashier or security guard.

Prior art proposals for checkout security require a cashier to check only certain shoppers, but to scan their entire cart full of goods. This type of system is unsatisfactory for those shoppers who are selected for full checking, since they must wait for the entire cart to be re-scanned (thus defeating the purpose of the self-checkout system), suffer potential embarrassment at being singled out by the store for security checking, etc. Thus, an entirely new methodology is needed to supplant this security checking system.

SUMMARY OF THE INVENTION

The present invention proposes the implementation of a statistical basis for use in a self-scanning checkout system for determining how many items to check in a shopper's shopping cart for incorrect or missing scans as well as which particular or types of items to check to determine if they were properly scanned. In the present invention, every or nearly every shopper will be checked by a cashier or security guard, but only a limited and select number of items will be checked for each shopper. The present methodology determines how many items to check for a given shopper as well as which particular items to check for that shopper. The following factors may be considered, alone or in varying combinations, in determining the number of items to check for a particular shopping transaction: shopper frequency (the number of times the shopper has visited that store); queue length (the length of the checkout line at that time); prior history (check more items if the shopper has had errors in the past, check less items if the shopper has had no errors in the past); store location (check more items in stores located in areas with a high risk of pilferage); time of day, day of week, date of year (determine if pilferage more likely at certain times of day or year); number of times items are returned to shelf during shopping; and dwell time between scans.

In a method aspect of the present invention, provided is a method for use in a self-service shopping checkout system wherein a shopper is provided with a self-scanning terminal for the scanning of the bar code of an item selected for purchase prior to depositing the item into a shopping cart, and wherein a list of items self-scanned by the shopper is compiled and made available to a cashier for surveillance and payment purposes, the method for performing a security check to determine if the shopper did not likely fail to scan an item prior to depositing the item into the shopping cart, the method comprising the steps of determining, as a function of a plurality of input criteria, the number of items n to be scanned, selecting from the shopper's cart of items presented for purchase n items to be scanned, scanning a bar code located on each of said n items selected for scanning, allowing the shopping transaction if each item selected for scanning is present on the list of self-scanned items compiled by the shopper, and disallowing the shopping transaction if any item selected for scanning is not present on the list of self-scanned items compiled by the shopper. The number of items n is determined as a function of the criteria mentioned above.

In a systems aspect, the present invention is a self-service shopping checkout system comprising a plurality of portable self-checkout devices, wherein each of the self-checkout devices is to be used by a customer to scan a bar code located on an item to be purchased so as to record therein a list of such items to be purchased; a stationary dispenser unit for the releasable containment of said plurality of portable self-checkout devices; and a plurality of point of sale terminals.

In the present system, each of the portable self-checkout devices comprises bar code scanning means for scanning and decoding a bar code located on an item to be purchased, means for compiling a list of items scanned by said customer, and a data output port for allowing transfer of said scanned item list to an associated data port located external to said portable device. The dispenser unit of the system comprises a plurality of device containment slots, each of said slots being configured for releasable containment of a mating self-scanning device, each of said slots having associated therewith a data input port suitable for mating with a data output port located on a portable self-checkout device, and a printer for printing a tally list of items scanned for purchase by said shopper, said tally list being supplied by a self-checkout device after said self-checkout device is returned to a device containment slot after being used by a shopper, said tally list further comprising a two-dimensional bar code encoded with said items scanned by said shopper, a unique identification record associated with said shopper, and the number of items scanned by said shopper. Each of the point of sale terminals in the present system comprises bar code reading means for reading said two-dimensional bar code from a tally list presented to a cashier operating said point of sale terminal, said bar code reading means providing as output data signals representing said items scanned by said shopper, said unique identification record associated with said shopper, and said number of items scanned by said shopper; said bar code reading means also configured so as to scan select items presented for checking by said cashier; means for determining, as a function of said number of items scanned by said customer and an internally stored check number unique to said customer, the number of items n to be scanned by the cashier; means for comparing the identity of the items scanned by said cashier with the list of items scanned by said customer; means for allowing the shopping transaction if each item selected for scanning by the cashier is present on the list of self-scanned items compiled by the shopper; and means for disallowing the shopping transaction if any item selected for scanning by the cashier is not present on the list of self-scanned items compiled by the shopper.

DESCRIPTION OF THE PREFERRED EMBODIMENT

Figure 3:
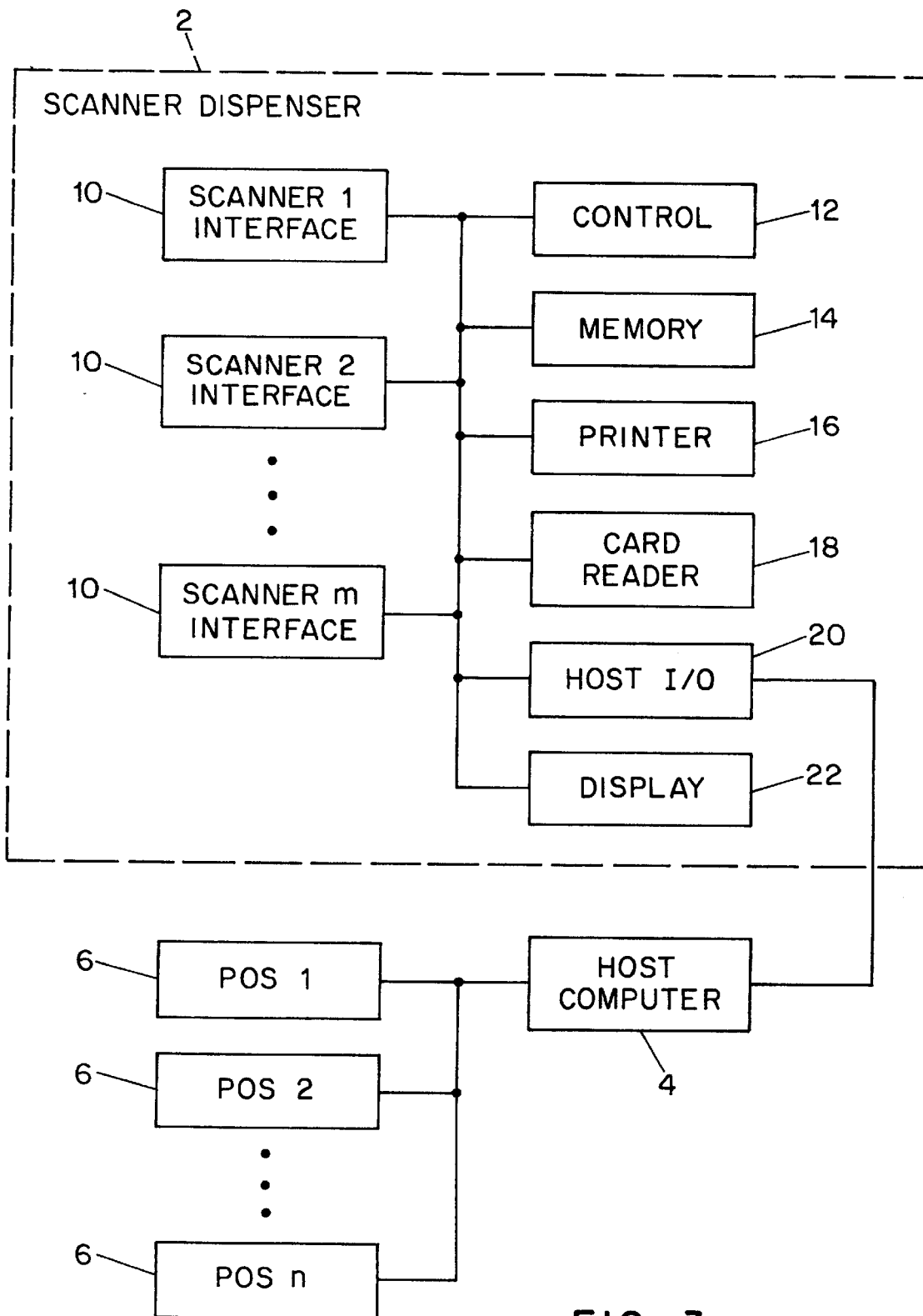
FIG. 3 is a block diagram of the system of the present invention.

FIG. 3 illustrates a block diagram of the secure self-service shopping system of the present invention. The system 2 comprises, at the top level, a scanner dispenser 2, a host computer system 4, and a plurality of point of sale (POS) terminals 6. The host computer 4 is a standard computer system well known in the prior art and found in retail establishments such as supermarkets for controlling operations of the supermarket, as modified as described below to carry out the methods and functions of the present invention. In particular, the host computer 4 is capable of interfacing with the scanner dispenser 2 for data communications therebetween in accordance with the present invention as will be described more fully below. Likewise, each POS terminal 6 is a standard POS computer system well known in the prior art and found in retail establishments such as supermarkets for controlling checkout functions of the supermarket, such as purchase item entry and payment tender functions, as modified as described below to carry out the methods and functions of the present invention. In particular, the POS terminal 6 is capable of interfacing with the host computer 4 for data communications therebetween in accordance with the present invention as will be described more fully below.

Figure 4:
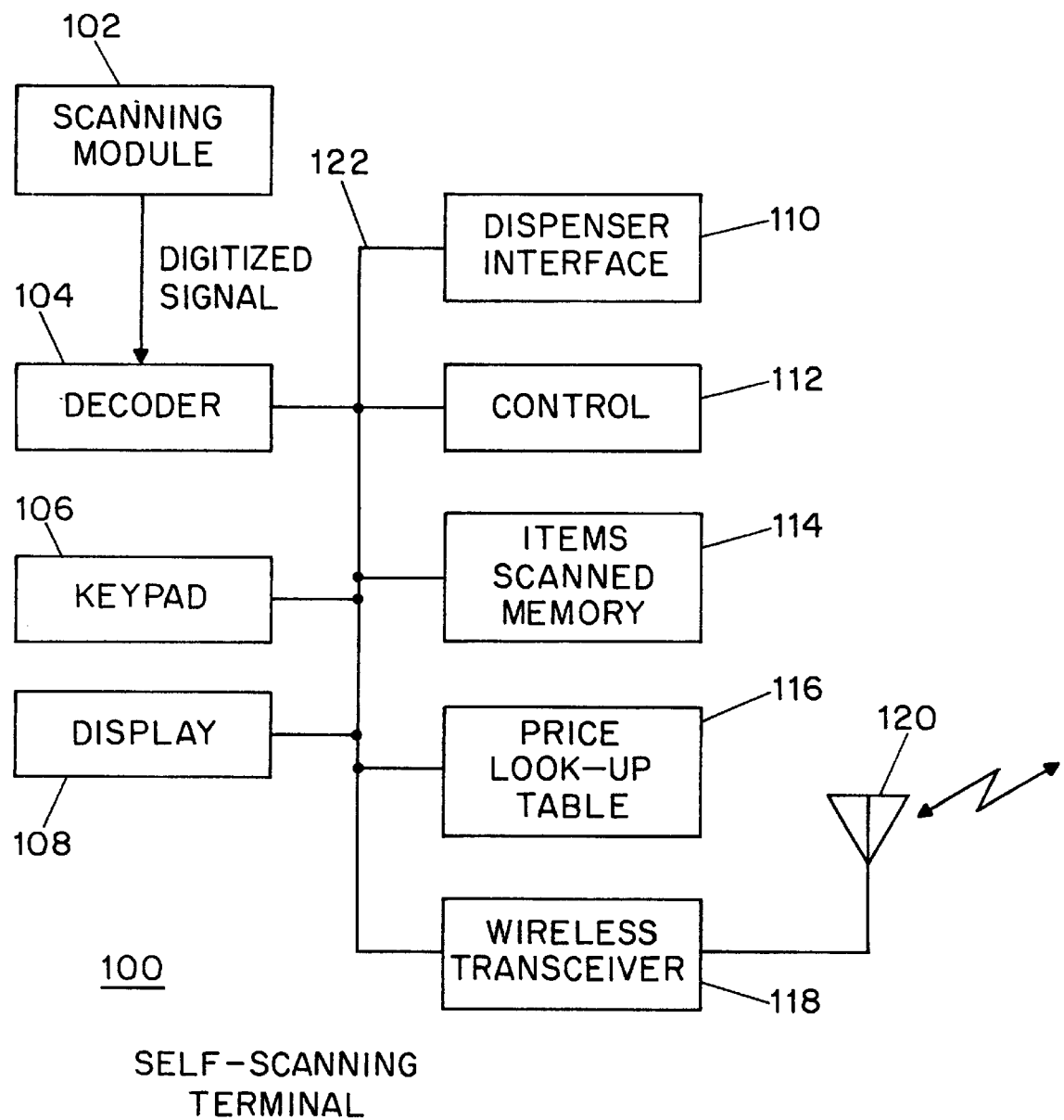
FIG. 4 is a block diagram of the self-scanning terminal of the present invention.

The scanner dispenser 2 is a stationary, i.e. wall-mounted chassis, which comprises a plurality of interface slots 10 configured to physically and electrically mate with an associated portable scanning terminal 100, shown in detail in FIG. 4. Each terminal 100 is placed within an associated recess in the dispenser 2 for data transfer functions, battery recharge, etc., after the shopper has used the scanning terminal for self-service scanning functions. After data has been transferred between the terminal 100 and the dispenser 2, as will be described below, and the terminal power supply (i.e. battery) is deemed to be suitable for re-use, then the dispenser 2 will allow a subsequent shopper to select that terminal for use in his or her shopping functions. The dispenser 2 also comprises a control processing section 12, a memory section 14, a printer 16, a card reader 18, a host I/O section 20, and a display 22, all of which will be described below in further detail.

When a shopper desires to obtain a scanning terminal 100 from the dispenser 2, he accesses the system by presenting a coded identification card to the card reader portion of the dispenser 2. The card reader may be a magnetic stripe reader, which is well known in the art. In this case, the shopper presents a "loyalty card" having an associated encoded magnetic stripe, comprising data indicative of the identity of the shopper. The shopper may also present a credit card, smart card, debit card or the like having a suitable encoded magnetic stripe. In an alternative embodiment, the card reader 18 may be a bar code symbol scanning device, suitable for reading a one or two dimensional bar code symbol printed on a loyalty card, driver's license or the like, for obtaining therefrom the required identification data. Any type of technology which lends itself towards the use of automatic identification may be implemented by this system.

Once the control section 12 of the dispenser 2 has determined that the requesting user is allowed to access a terminal 100 (i.e. the shopper is a member of the self-service shopping system), an terminal is assigned to the user and the identity of the assigned terminal is signaled to the user in any of various ways. For example, an LED associated with and in close proximity to the assigned terminal may be caused to blink on and off, thus catching the attention of the shopper and indicating that he should select that terminal. Likewise, appropriate instructions may be displayed to the shopper via the display 22, such "Please take terminal number 17" or the like. Concurrently therewith, a locking mechanism which may be used for terminal security purposes to prevent unauthorized removal of the terminal will be disabled by the dispenser control logic 12, thus enabling the removal of the assigned terminal 100 from the dispenser 2 by the shopper.

The scanning terminal 100 shown in block diagrammatic form in FIG. 4 is a lightweight, portable, hand-holdable device well suited for carrying by the shopper and performing data entry functions such as keypad entry and/or bar code scanning of items selected for purchase. The terminal 100 comprises a scanning module 102, a decoder 104, a keypad 106, a display 108, a dispenser interface section 110, a control section 112, an items scanned memory section 116, and, optionally, a wireless transceiver 118 and antenna 120, all of which function in operative association with bus 122 as further described.

The scanning module 102 and decoder 104 operate in conjunction in a manner well known in the art to allow the user to scan a bar code located on an item selected for purchase and input onto bus 122 for subsequent processing. For example, in the preferred embodiment, the scanning module 102 is a laser bar code scanner which utilizes a laser light source, a scanning means such as a mirror mounted on a miniature motor, and a photosensor for receiving light reflected from a target bar code and for converting the received reflected light into an electrical signal indicative of the degrees of reflectivity of the various portions of the bar code. The scanning module also comprises signal processing which digitizes the signal from the photosensor so that the decoder may perform an analysis thereon to determine the data represented by the bar code. A laser scanning device such as this is well known in the art and may be found, for example, in U.S. Pat. No. 5,479,000, which is incorporated by reference herein. In addition, the scanning module may be of the CCD type, which utilizes a linear or two-dimensional CCD array for capturing the reflected light (ambient or otherwise) from the target bar code and for generating an associated signal which is processed in accordance with techniques well known in the art.

After the user has scanned a bar code from a target item, the decoded data signal indicative of the data represented by the target bar code is output by the decoder onto the bus 122. The decoded data is used to fetch price and item description information from the price look-up table 116, which is in turn sent to the display 108 for display to the user. The price and description data is also sent to the item scanned memory 114 for storage therein such that the item scanned memory 114 will compile a tally list of all items scanned by the user in that shopping trip.

If desired, the user may delete an item from the tally list by scanning the bar code of the item and depressing an appropriate function key found on the keypad, e.g. a "minus" key, to signal to the control logic 112 that the associated scanned bar code is to removed from, rather than added to, the tally list in the memory 114. Thus, when the user changes his mind about the purchase of an item scanned, he may re-scan the item, press the appropriate return key, place the item back on the shelf, and the tally list will reflect accurately only those items intended to be purchased by the user.

The user may, at any desired time, obtain a subtotal of the items scanned for purchase and resident in memory 114 by depressing an appropriate key on the keypad 106, e.g. a "subtotal" key. This key will cause the control logic section 112 to fetch the price of each item from the memory 114, add the prices together, and display the total on the display 108. This enables the user to ensure that he has not exceeded a certain spending limit.

Figure 5:
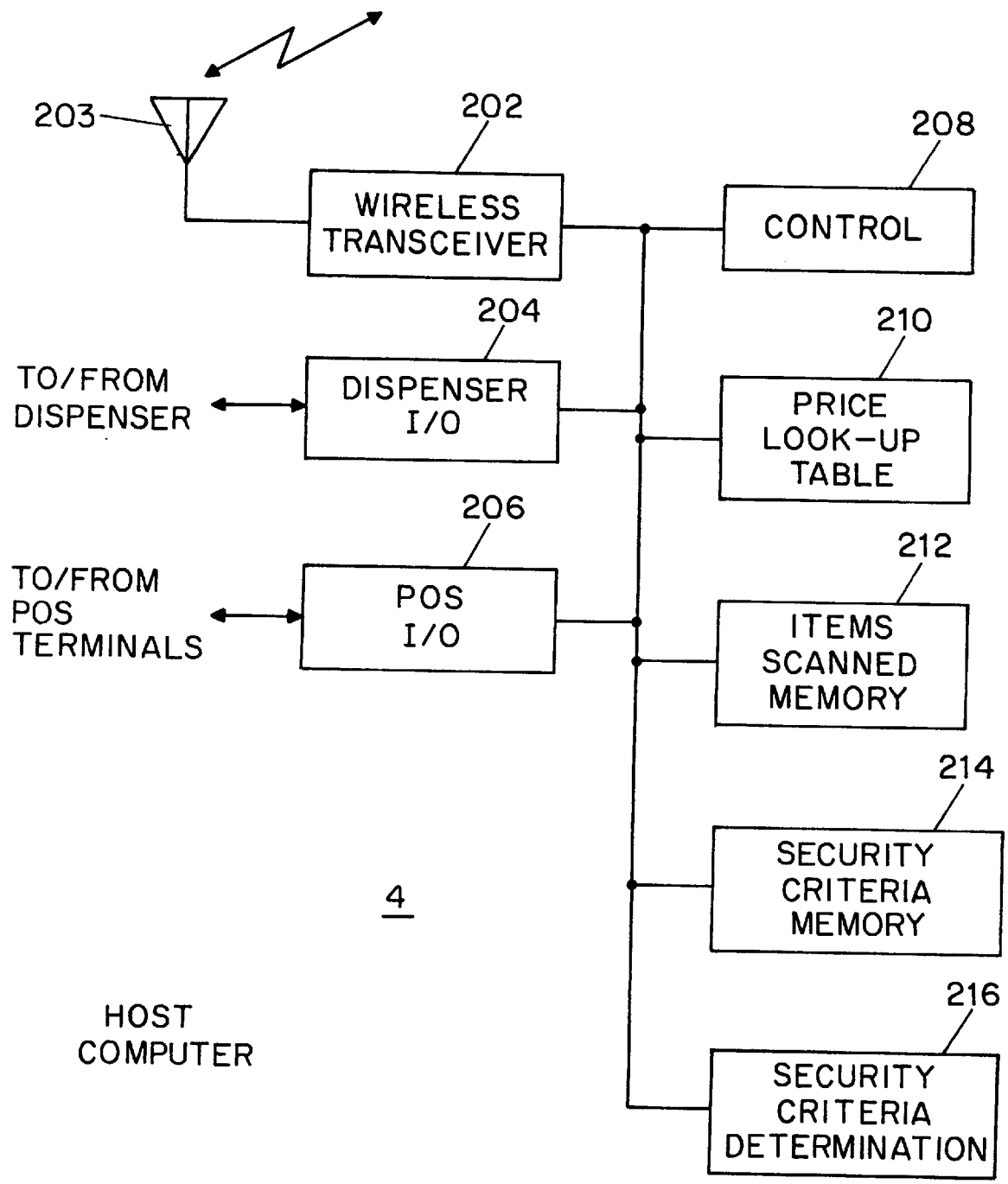
FIG. 5 is a block diagram of the host computer of the present invention.

In the alternative to looking up the price and description of the scanned item from a terminal-resident memory such as the look-up table 116, the terminal 100 may employ wireless communication with the host computer 4 via the optional wireless transceiver 118 and antenna 120. In such an embodiment, the price and item description information is stored in the price look-up table 210 at the host computer 4, as shown in FIG. 5. The decoded bar code data is sent via the transceiver 118 to the associated antenna 203 and transceiver 202 at the host computer 4, which fetches the price and item description from its price look-up table 210 and sends it back to the terminal 100 via the wireless link. This type of embodiment eliminates the need for a look-up table to be stored in each terminal 100, and changes to the data in the price look-up table may be made at the host rather than requiring each terminal 100 to be revised when the price or item description is changed.

In addition, when a wireless data link is used to allow communications between the terminal 100 and the host 4, then the tally list of items scanned may be kept in an appropriate memory location in the items scanned memory 212 at the host computer 4 rather than utilizing an on-board memory 114. Deletion of an item and acquisition of a subtotal may be likewise executed through the wireless link rather than performing those functions at the terminal 100.

The wireless link may be accomplished via an RF (radio frequency) link, which is well known in the art and is described in detail in U.S. Pat. No. 5,157,687; which is incorporated by reference herein. In an RF based scenario, the host transceiver would likely be physically located near the host since communications with the terminals need not be in close proximity. In the alternative, other wireless technologies such as infrared communications may be implemented, with transceiver stations strategically located throughout the store for communications with each terminal 100 as the shopper proceeds through the store.

When the shopper has completed scanning items for purchase, he brings the terminal 100 back to the scanner dispenser 2 and places the terminal 100 within an appropriate mating recess for communications with the scanner interface 10. When the terminal has implemented an on-board look-up table 116 and memory 114, then the tally list of items scanned is downloaded from the memory 114 to the host computer 4 for further processing. Along with the tally list, data indicative of the identity of the shopper, which is obtained when the shopper initially requests a terminal 100 from the dispenser 2 as described above, is downloaded to the host 4. The host 4 thusly has stored therein the identity of the shopper along with data indicative of the items selected for purchase. If the system is operating in wireless communications mode, then the items scanned memory 212 at the host computer will contain the tally list of items scanned for purchase for that particular shopper without the need for downloading from the scanning terminal at the dispenser interface.

Figure 1:
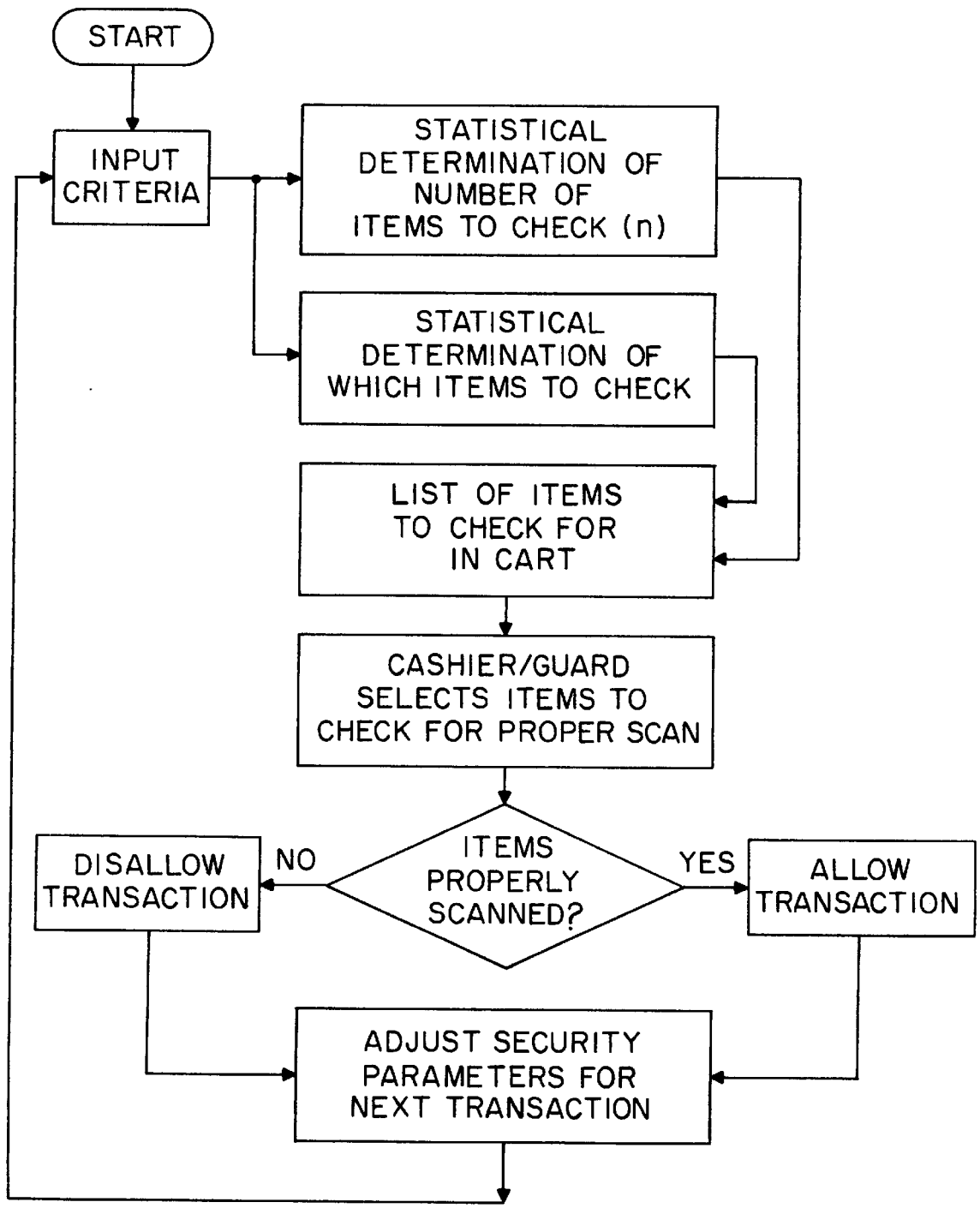
FIG. 1 is a flowchart of the method of the present invention.
Figure 2:
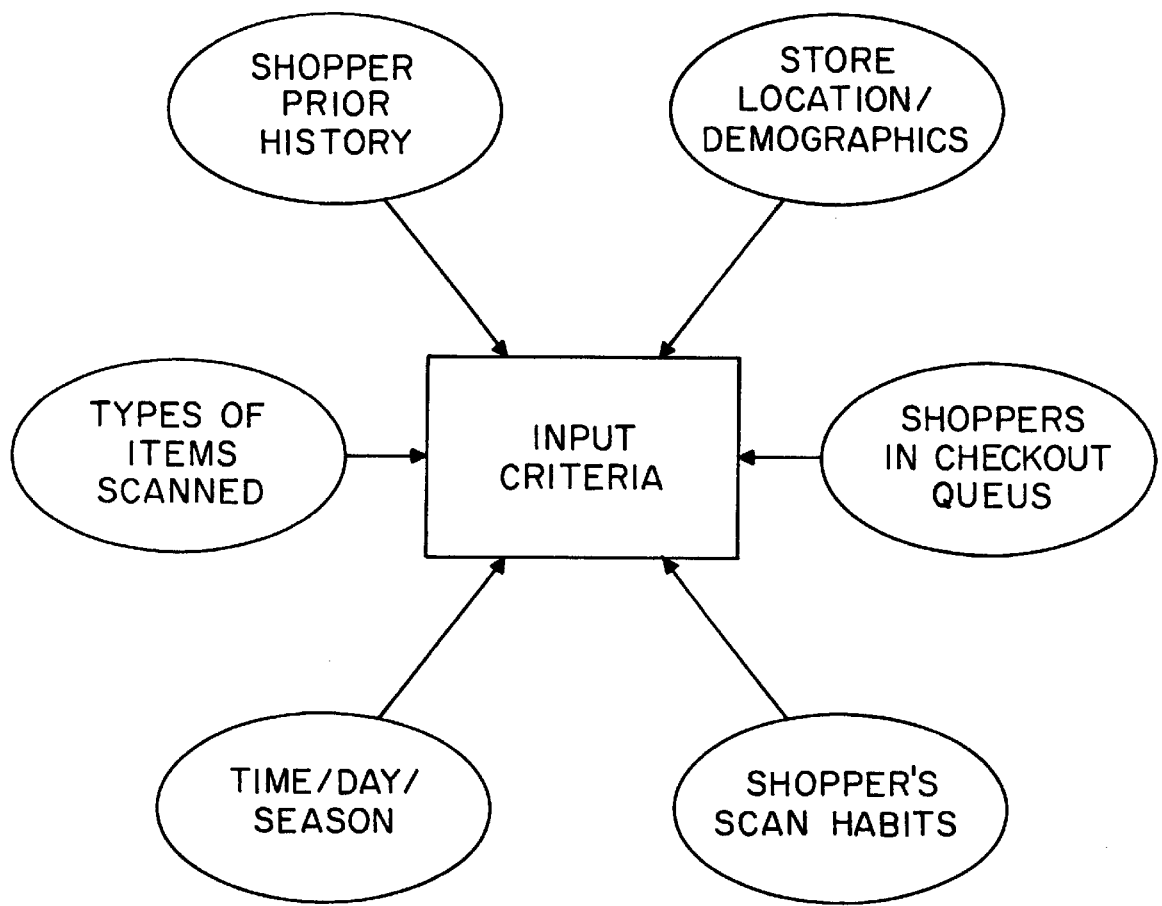
FIG. 2 is a diagram of the input criteria used in the present invention.

After determining that the shopper has completed selecting and scanning items for purchase, the host computer proceeds to determine, in accordance with the present invention, the items to be checked by the checkout cashier (or security guard or the like). Referring to FIG. 5, the host computer has stored in a security criteria memory 214 a plurality of security criteria which are used to determine the items to check by the cashier. As shown in FIGS. 1 and 2, the security criteria include, but are not limited to, the following:

1. Shopper frequency: the frequency of visits of the shopper is a factor to consider in determining the number of items to check. A counter is kept in memory for each member of the self-service system, which is incremented every time the shopper has visited the store. In general, the more the shopper has visited the store, the lower the number of items will be checked, since so-called loyal shoppers will be given the benefit of having less items checked.

2. Queue length: the host computer will know the approximate length of the queue by observing the number terminals have been used and returned to the dispenser, but which have not yet been checked out at the POS terminal. Since a goal of the system is to maintain a high throughput of shoppers, it may be postulated that less items will be checked when the queue length is long.

3. Prior history: the specific prior history of the particular shopper is stored and used to factor in the determination of the number of items to be checked. That is, shoppers with a prior history of scanning errors, as determined by the security check at the POS terminal, will have more items checked than shoppers with less errors in the past.

4. Store location: demographic indicia linked to the likelihood that pilferage will occur more frequently in a certain geographic location may be factored into the determination of the number of items to be checked.

5. Time of day/day of week/date of year: statistical analysis of pilferage as it may be linked to the time of day, day of week or date of year may be factored into the determination.

6. Item returns: the host computer will have information available to it as to the number of times a shopper has depressed the minus key, which indicates a scanned item has been returned to the shelf. A likelihood exists that a shopper who has depressed this key an excessive amount of times is more likely to have failed to actually returned the item to the shelf, and thus the number of items to be checked should increase as this factor increases.

7. Dwell time between scans: the elapsed or dwell time between scans by the shopper may be examined by time-tagging the scans and analyzing the shopping pattern. Thus, for example, it may be statistically determined that shoppers should scan an item once every minute. When a shopper takes five minutes to scan the next item, it may be presumed that items may have been selected for purchase but not scanned in that interim. those shoppers with inordinate dwell times may have more items checked.

After the host computer 4 has used the security criteria as described above in order to ascertain, via the security determination logic means 216, the specific number of items to check for scan accuracy by the cashier or security guard, it proceeds to determine which types of items the cashier or security guard should look for in selecting the items to check. Factors to consider in determining which items to look for from among the shoppers purchases include the following:

1. Statistical determination of highly pilfered items: Historically, certain items such as batteries or razors (high cost, small package size) have a higher percentage of pilferage than other items such as watermelons (low cost, large package size).

2. Prior history: the specific prior history of the particular shopper is stored and used to factor in the determination of which items should be checked. That is, shoppers with a prior history of scanning errors for certain items, as determined by the security check at the POS terminal, will have those particular items checked.

3. Store location: demographic indicia linked to the likelihood that pilferage of certain items will occur more frequently in a certain geographic location may be factored into the determination of the specific items to be checked.

4. Time of day/day of week/date of year: statistical analysis of pilferage of certain types of items as it may be linked to the time of day, day of week or date of year may be factored into the determination.

5. Item returns: the host computer will have information available to it as to the number of times a shopper has depressed the minus key for certain items, which indicates that that scanned item has been returned to the shelf. A likelihood exists that a shopper who has depressed this key an excessive amount of times is more likely to have failed to actually returned the item to the shelf, and thus that item should be checked.

6. Dwell time between scans: the elapsed or dwell time between scans by the shopper may be examined by time-tagging the scans and analyzing the shopping pattern. Thus, for example, it may be statistically determined that shoppers should scan an item once every minute. When a shopper takes five minutes to scan the next item, it may be presumed that items may have been selected for purchase but not scanned in that interim. By analyzing the store location as a function of dwell time increase (by checking adjacent scans and extrapolating the interim location of the shopper), it can be determined which items should be checked.

Once the analysis has been made by the host computer as to which specific (or types of) items should looked for by the cashier or security guard, then data indicative thereof is stored along with the number of items to be checked for that shopper in the memory of the host computer 4. This data is available for download to the appropriate POS terminal selected for final checkout by the shopper after he has returned the scanning terminal 100 to the dispenser 2.

The shopper may then proceed to an appropriate POS terminal 6, which is manned by a cashier for tender of payment and security checking of the items selected for purchase. When the shopper reaches the POS station, he presents his loyalty card (or other suitable automatic identification card) to the cashier, who will present the card to an appropriate card reader for automatic identification of the shopper. The shopper's identification data is used to fetch from the host computer 4 the tally list of items scanned and the data indicative of the number of items to be checked as well as the identity of specific items or types of items to look for in performing the audit process.

The cashier or security guard reads from the display at the POS terminal the list of items to check (or from a printed version of the list) and selects the items for checking. The cashier scans the bar code of each item, and if any item scanned is not on the tally list, the cashier or security guard is alerted that the shopper has made an error in scanning. In this case, the retail establishment may opt to re-scan the entire shopping cart, may simply add the item to the tally list, or may take some other act it deems appropriate for the situation. Data indicative of the mis-scanned item is then transmitted from the POS terminal back to the host computer and stored in its security criteria memory 214 for subsequent processing and subsequent criteria determination.

I claim:

1. In a self-service shopping checkout system wherein a shopper is provided with a self-scanning terminal for the scanning of the bar code of an item selected for purchase prior to depositing the item into a shopping cart, and wherein a list of items self-scanned by the shopper is compiled and made available to a cashier for surveillance and payment purposes, the improvement comprising a method for performing a security check to determine if the shopper has failed to scan an item prior to depositing the item into the shopping cart, said method comprising the steps of:

a) determining, as a function of a plurality of input criteria, the number of items n to be scanned by the cashier;

b) selecting from the shopper's cart of items presented for purchase n items to be scanned by the cashier;

c) scanning a bar code located on each of said n items selected for scanning;

d) allowing the shopping transaction if each item selected for scanning is present on the list of self-scanned items compiled by the shopper; and e) disallowing the shopping transaction if any item selected for scanning is not present on the list of self-scanned items compiled by the shopper.

2. The method of claim 1 wherein the number of items n to be scanned by the cashier is determined by obtaining said number n from a computer memory.

3. The method of claim 2 further comprising the step of, when the shopping transaction has been allowed, decreasing the number of items n to be scanned and re-storing said decreased number n in said computer memory whereby the shopper will have less items scanned upon the next shopping transaction.

4. The method of claim 2 further comprising the step of, when the shopping transaction has been disallowed, increasing the number of items n to be scanned and re-storing said increased number n in said computer memory whereby the shopper will have more items scanned upon the next shopping transaction.

5. The method of claim 1 wherein the input criteria for determining the number of items n to be scanned comprises predetermined input criteria.

6. The method of claim 5 wherein the predetermined input criteria for determining the number of items n to be scanned comprises the frequency at which the shopper has previously utilized the self-service shopping checkout system.

7. The method of claim 5 wherein the predetermined input criteria for determining the number of items n to be scanned comprises the number of shoppers utilizing the self-service shopping checkout system.

8. The method of claim 5 wherein the predetermined input criteria for determining the number of items n to be scanned comprises the number of shoppers waiting to be checked out.

9. The method of claim 5 wherein the predetermined input criteria for determining the number of items n to be scanned comprises prior checkout history of the shopper utilizing the system at that time.

10. The method of claim 5 wherein the predetermined input criteria for determining the number of items n to be scanned comprises a risk factor associated with the geographic area in which the store is located.

11. The method of claim 5 wherein the predetermined input criteria for determining the number of items n to be scanned comprises a risk factor associated with prior theft history of the store.

12. The method of claim 5 wherein the predetermined input criteria for determining the number of items n to be scanned comprises the time of day.

13. The method of claim 5 wherein the predetermined input criteria for determining the number of items n to be scanned comprises the day of the week.

14. The method of claim 5 wherein the predetermined input criteria for determining the number of items n to be scanned comprises the date of the year.

15. The method of claim 5 wherein the predetermined input criteria for determining the number of items n to be scanned comprises the percentage of self-scans made by the shopper which were allocated to items returned to the shelf during shopping.

16. The method of claim 5 wherein the predetermined input criteria for determining the number of items n to be scanned comprises the measured dwell time between self-scans by the shopper.

17. The method of claim 5 wherein the predetermined input criteria for determining the number of items n to be scanned comprises scans of bar codes of preselected items determined to be associated with high pilferage.

18. In a self-service shopping checkout system wherein a shopper is provided with a self-scanning terminal for the scanning of the bar code of an item selected for purchase prior to depositing the item into a shopping cart, and wherein a list of items self-scanned by the shopper is compiled and made available to a cashier for surveillance and payment purposes, the improvement comprising a system for performing a security check to determine if the shopper has failed to scan an item prior to depositing the item into the shopping cart, said system comprising:

a) means for determining the number of items n to be scanned;

b) means for scanning each of n items selected from the shopper's cart of items presented for purchase;

c) means for allowing the shopping transaction if each item selected for scanning is present on the list of self-scanned items compiled by the shopper; and e) means for disallowing the shopping transaction if any item selected for scanning is not present on the list of self-scanned items compiled by the shopper.

19. A self-service shopping checkout system comprising a) a plurality of portable self-checkout devices, each of said self-checkout devices to be used by a customer to scan a bar code located on an item to be purchased so as to record therein a list of such items to be purchased, each of said devices comprising bar code scanning means for scanning and decoding a bar code located on an item to be purchased, means for compiling a list of items scanned by said customer, and a data output port for allowing transfer of said scanned item list to an associated data port located external to said portable device;

b) a stationary dispenser unit for the releasable containment of said plurality of portable self-checkout devices, said dispenser unit comprising:

(i) a plurality of device containment slots, each of said slots being configured for releasable containment of a mating self-scanning device, each of said slots having associated therewith a data input port suitable for mating with a data output port located on a portable self-checkout device; and (ii) a printer for printing a tally list of items scanned for purchase by said shopper, said tally list being supplied by a self-checkout device after said self-checkout device is returned to a device containment slot after being used by a shopper, said tally list further comprising a two-dimensional bar code encoded with said items scanned by said shopper, a unique identification record associated with said shopper, and the number of items scanned by said shopper;

c) a plurality of point of sale terminals, each of said point of sale terminal comprising:

(i) bar code reading means for reading said two-dimensional bar code from a tally list presented to a cashier operating said point of sale terminal, said bar code reading means providing as output data signals representing said items scanned by said shopper, said unique identification record associated with said shopper, and said number of items scanned by said shopper; said bar code reading means also configured so as to scan select items presented for checking by said cashier;

(ii) means for determining, as a function of said number of items scanned by said customer and an internally stored check number unique to said customer, the number of items n to be scanned by the cashier;

(iii) means for comparing the identity of the items scanned by said cashier with the list of items scanned by said customer;

(iv) means for allowing the shopping transaction if each item selected for scanning by the cashier is present on the list of self-scanned items compiled by the shopper; and (v) means for disallowing the shopping transaction if any item selected for scanning by the cashier is not present on the list of self-scanned items compiled by the shopper.

20. A method for enhancing the accuracy of a self-check out system wherein a customer selects a plurality of items for purchase and registers the plurality of items with a portable terminal, said method comprising the steps of: (a) automatically computing the probability that the customer has failed to properly register the plurality of items selected for purchase with the portable terminal, and (b) selectively scanning a number of the customer selected plurality of items less than all the customer selected plurality of items if the probability that the customer has failed to properly register the plurality of selected items exceeds a predetermined acceptance value.

21. The method of claim 20 wherein the step of analyzing the probability that a customer has failed to properly register the plurality of selected items with the portable terminal comprises the steps of:

(a) storing a customer's prior purchasing history; and (b) comparing the plurality of items registered with the portable terminal by the customer to the customer's prior purchasing history.

22. The method of claim 21 wherein the predetermined acceptance value is modified to reflect the availability of an attendant to perform the step of selectively scanning the number of selected items within a predetermined time period.

23. The method of claim 22 wherein the step of determining the availability of the attendant comprises the step of determining queue length for the attendant.

24. The method of claim 22 wherein the predetermined acceptance value is modified to reflect a high pilferage rate condition indicative of a time period of historically high pilferage rates for the self-checkout system.

25. The method of claim 20 wherein the portable terminal includes a means for unregistering previously registered items, and the step of analyzing the probability that a customer has failed to properly register the plurality of selected items with the portable terminal comprises the steps of:

(a) determining a registered item dwell time for each of the plurality of selected items registered with the portable scanner;

(b) determining an unregistered item dwell time for items registered with the portable terminal by the customer and subsequently unregistered with the portable terminal; and (c) comparing the dwell times for registered and unregistered items.

26. The method of claim 20 wherein the step of analyzing the probability that a customer has failed to properly register the plurality of selected items with the portable terminal comprises the step of modifying the predetermined acceptance value to reflect the number of times the customer has previously had items selectively scanned without an incident of error in registering items selected for purchase with the portable terminal.

27. An apparatus for performing the method of claim 20 wherein said apparatus is a computer in communication with a plurality of portable terminals having an integrated bar code reader.

28. A method for selectively checking a plurality of items collected by a customer with a portable scanner used to perform a self-checkout function, said method comprising the step of determining a probability of erroneous registration for the plurality of items collected by the customer with the portable terminal relative to an acceptable risk value in accordance with the following steps:

(i) determining the customer's historical erroneous registration rate using a customer's prior purchasing history including a record of erroneous registrations detected during a selective scanning check; and (ii) modifying the acceptable risk value by at least one secondary factor.

29. The method of claim 28 wherein the at least one secondary factor is an evaluation of the availability of an attendant to perform a selective scanning operation.

30. The method of claim 29 wherein the at least one secondary factor further comprises a non-customer specific error history record for the self-checkout system.

* * * * *